Figure 1:
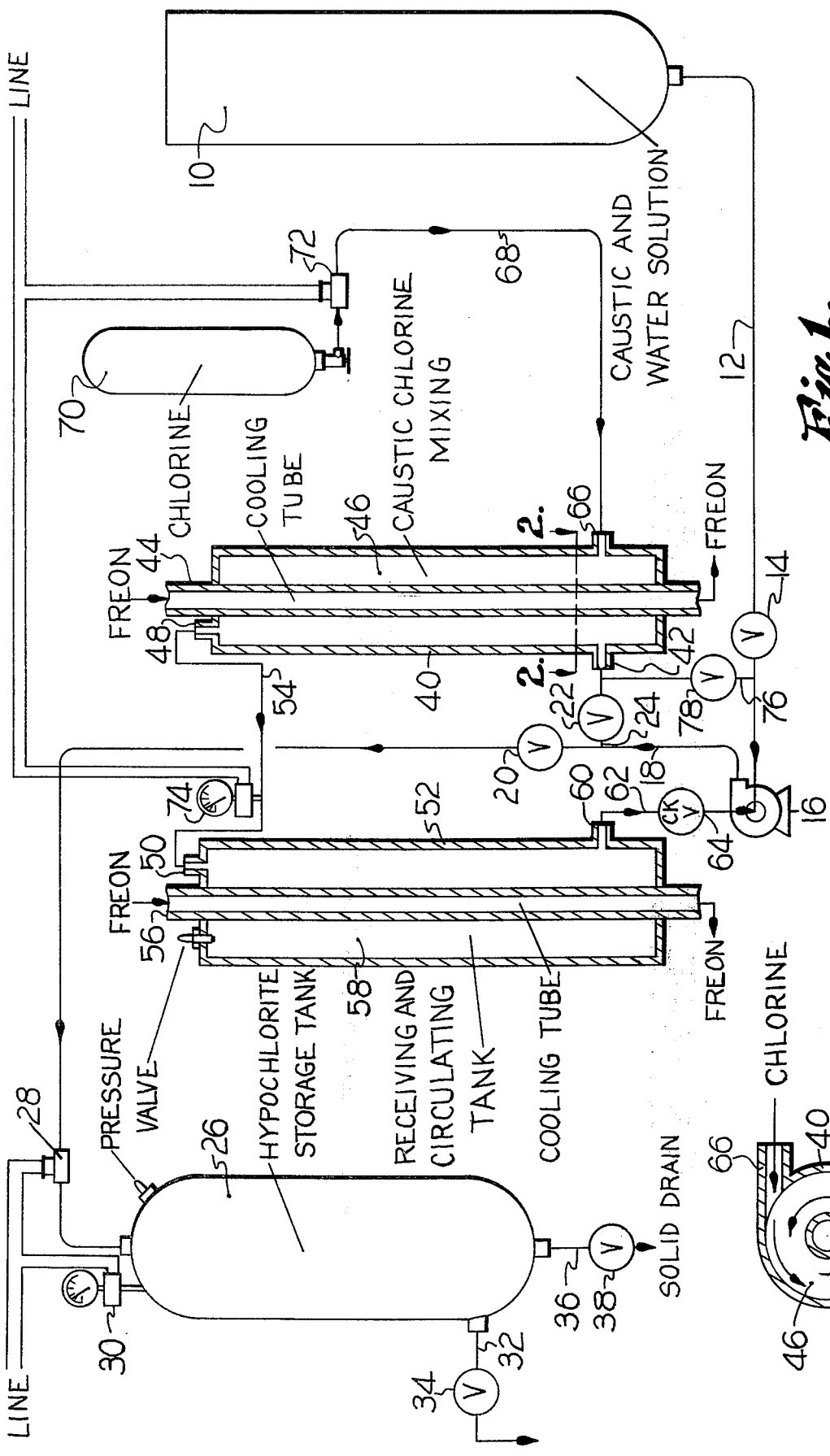

United States Patent [19]

King

[11] 4,010,244
[45] Mar. 1, 1977

[54] HYPOCHLORITE PRODUCTION

[76] Inventor: Arthur Shelley King, 8021 Cherokee Lane, Leawood, Kans. 66206

[22] Filed: July 16, 1975

[21] Appl. No.: 596,319

[52] U.S. Cl. .............................. 423/473; 423/474
[51] Int. Cl.² ...................................... C01B 11/06
[58] Field of Search ................... 423/613, 473, 474

[56] References Cited
UNITED STATES PATENTS

| | | | |
|---|---|---|---|
| 1,403,993 | 1/1922 | Wallace et al. | 423/473 |
| 1,884,200 | 10/1932 | Philipp | 423/474 |
| 3,069,282 | 12/1962 | Allen | 423/613 X |
| 3,241,912 | 3/1966 | Nicolaisen | 423/474 |

*Primary Examiner*—Edward Stern
*Attorney, Agent, or Firm*—Schmidt, Johnson, Hovey & Williams

[57] ABSTRACT

Hypochlorite is produced by mixing chlorine and a strong alkali solution within a completely closed region filled with solution to eliminate the presence of any air pockets, thereby assuring that the gaseous chlorine will not escape from the solution during the mixing process. In carrying out the mixing step, the alkali solution and chlorine are introduced through relatively closely-spaced small streams into an enlarged chamber so that, effectively, mixing occurs by small amounts at the point of introduction of the two streams, instead of simply introducing a small amount of chlorine into a large volume of alkali solution. Mixing is further enhanced by the fact that the two streams are introduced tangentially into the chamber at diametrically opposed locations so that they swirl upwardly through the chamber in laminar flow relationship.

4 Claims, 2 Drawing Figures

HYPOCHLORITE PRODUCTION

This invention relates to the production of hypochlorite solution, often used as a household bleaching agent, and more particularly relates to a new and improved manner of mixing chlorine with an alkali and water solution to produce the desired hypochlorite solution.

One important object of the present invention is to eliminate the multitude of problems inherent in conventional hypochlorite production techniques which typically involve bubbling chlorine gas through an open vat of sodium hydroxide and water solution. Chunks of ice are periodically added to the vat in order to maintain the solution at a satisfactorily low temperature to compensate for the heat generated by the chlorine combining with the alkali solution, such heat tending to increase the tendency for the chlorine to leave the solution in the form of gas rather than remain fully dissolved. Hypochlorite production carried out in this manner is slow, uneconomical, and can be quite hazardous to personal safety in view of the chlorine fumes that are continually emitted.

Accordingly, another important object of the present invention is to provide for the production of hypochlorite solution within a completely enclosed region so that chlorine fumes cannot escape to the atmosphere with the attendant danger to personal safety and well-being.

An additional important object of this invention is to carry out mixing of the chlorine with the strong alkali solution within a region that is completely filled with the solution so that no air pockets are presented within which chlorine vapors could collect, thereby increasing the extent to which the chlorine becomes fully dissolved within the solution.

A further important object of the invention is to mix the alkali solution and chlorine on an equal volume basis by bringing together two small streams of the solution and chlorine gas in relatively close proximity to one another within the mixing region such that mixing occurs on an increment-by-increment basis with each increment of chlorine being met by and mixed with a substantially equal increment of alkali solution.

A still further important object of this invention is to further augment the mixing action by swirling the alkali solution and chlorine together in an upward spiral with laminar flow through the main mixing chamber of the system.

Figure 2:
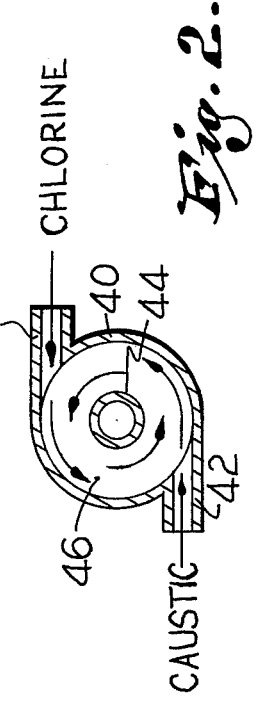

In the drawing:

FIG. 1 is a schematic diagram of a system for producing hypochlorite solution in accordance with the principles of the present invention; and FIg. 2 is a horizontal, cross-sectional view through the main mixing tank of the system taken along line 2—2 of FIG. 1 and illustrating the manner in which the chlorine and alkali solution are introduced tangentially into the tank.

A supply tank 10 of large volume may be utilized as a container in which the alkali solution is initially prepared. Sodium hydroxide and water may be introduced into tank 10 manually in appropriate amounts in order to arrive at a solution having the desired concentration of sodium hydroxide. The particular concentration selected is a matter of personal through a and is not critical to the principles of the present invention. with a A supply line 12 leads from the bottom of tank 10 and is controlled by a valve 14 which remains closed during the period that the solution is being prepared within tank 10. A pump 16 on the downstream side of valve 14 receives solution through line 12 when valve 14 is open and delivers the solution througha delivery line 18 to a valve 20 in line 18 and to a valve 22 in a branch line 24. Line 18 downstream from valve 20 communicates witha final storage tank 26, and just ahead of tank 26 is located an electrically powered valve 28 which opens and closes that portion of line 18 in response to pressure within tank 26 sensed by the sensor 30 on the same electric circuit as valve 28. A product drain 32 controlled by valve 34 is used to draw off finished hypochlorite solution from tank 26, and a drain 36 for solids which have settled out in tank 26 is controlled by a valve 38.

The branch line 24 downstream from valve 22 communicates with an upright mixing tank 40 through an inlet 42 adjacent the bottom of tank 40. A cooling tube 44 connected to a source of a suitable coolant such a freon extends concentrically through tank 40 end-to-end thereof and presents an annular region 46 surrounding tube 44 within tank 40. An outlet 48 at the top of tank 40 communicates with an inlet 50 of an upright cooling tank 52 through a line 54, and tank 52 is of similar construction to the mixing tank 40 having a concentrically disposed cooling tube 56 carrying refrigerant extending from top to bottom thereof. An annular cooling region 58 is thereby presented within tank 52 around cooling tube 56, such region 58 having an outlet 60 that communicates with pump 16 through a drain line 62 controlled by a check valve 64 that permits flow only toward the pump 16.

Mixing tank 40 has a second inlet 66 that is coupled with a line 68 from a chlorine supply tank 70, the line 68 preferably having an electrically powered valve 72 therein that opens and closes in response to pressure sensed in line 54 by sensor 74. As illustrated best in FIG. 2, the inlets 42 and 66 to the mixing tank 40 approach the latter tangentially at substantially diametrically opposed locations in tank 40, the inlets 42 and 66 of course being at the same level. A line 76 having a valve 78 therein interconnects line 24 on the downstream side of valve 22 and line 12 on the downstream side of valve 14.

In producing a quantity of hypochlorite solution, the valve 14, 20, and 78 are initially closed as a quantity of alkali solution is prepared in the supply tank 10. The quantity prepared should be significantly greater than the combined volumes of tanks 40 and 58 plus their interconnected flow lines for reasons which will hereinafter be apparent, and when the solution within tank 10 is fully prepared, valve 14 is opened to supply the alkali solution to pump 16. Valve 20 is kept closed, but valve 22 is maintained open so that pump 16 delivers the alkali solution into mixing tank 40 to fill region 46. When the later is filled, the solution overflows into line 54 to in turn fill region 58 within cooling tank 52. The solution within tank 52 in turn flows to the pump 16 which recirculates the same back into the tank 40, and this procedure continues until the solution from supply tank 10 has completely filled not only the regions 46 and 58 of tanks 40 and 52, but also the regions within lines 54, 62, 24, and 18 upstream from valve 20. At this point, the valve 14 controlling the supply from tank 10 is closed.

As pump 16 continues to circulate the alkali solution, the pressure which is built up within the circulation system is sensed by sensor 74 which in turn causes the valve 72 controlling chlorine tank 70 to open. This allows the liquid chlorine within tank 70 to flow through line 68 and enter the mixing tank 40 through its inlet 66. As the liquid chlorine enters tank 40, it immediately changes to a gas because of reduced pressure, and the two streams of chlorine and alkali solution swirl concentrically upwardly through region 46 and around cooling tube 44 as illustrated in FIG. 2. Thus, even though mixing region 46 is full of solution, the two tangentially approaching streams of alkali solution and chlorine are effectively combined on an increment-by-increment basis; that is, at the precise point of mixing adjacent the bottom of tank 40, substantially equal volumes of chlorine and alkali solution are being merged together such that each new volume of alkali solution entering inlet 42 meets a new corresponding volume of chlorine entering inlet 66, to the end that the chlorine becomes well dissolved within the alkali solution.

Swirling the two constituents in a laminar flow relationship up and around the cooling tube 44 also enhances the mixing action, and because the region 46 is maintained devoid of any air space, the chlorine gas is unable to escape from the solution such that more complete dissolving is effected. The cooling action afforded by tube 44 at this time of course helps maintain the hypochlorite which is created in a more stable condition such that the chlorine has less tendency to attempt to escape from the solution.

As the now hypochlorite solution is carried over into the main cooling tank 52 through line 54, the chlorine still has no chance to escape from the solution because of the lack of any air space. Even through the line 62 and into pump 16 for recycling, there is no escape path made available to the chlorine, such that it has no choice but to remain fully dissolved within the solution. The presence of the second cooling tube 56 augments the cooling action afforded by the first tube 44 to help stabilize the hypochlorite solution that has been produced.

When the desired concentration of hypochlorite solution has been obtained, which can be of course closely approximated by simply weighing the chlorine tank 70 throughout the mixing process until a known amount of chlorine has been introduced, the valve 20 may be opened, the valve 22 closed, and the valve 78 opened. Opening of valve 20 causes the hypochlorite solution to be delivered from pump 16 to the storage tank 26 instead of being recirculated back into the mixing tank 40, and this action causes a pressure drop in line 54 which is sensed by sensor 74 to close valve 72 and thereby terminate delivery of chlorine from tank 70. Opening of the valve 78 allows the mixing tank 40 to drain through inlet 42, and the drained solution is of course received by the pump 16 and merged with that volume coming from tank 52 so that the resulting combined volumes are directed to the storage tank 26 for subsequent storage and use. If desired, the next batch of alkali solution could have been prepared within supply tank 10 during the period that the valve 14 was closed and mixing was taking place within the tank 40. In any event, when the storage tank 26 has been filled, valves 20 and 78 are thereupon closed while valve 22 is reopened so that when a new supply of alkali solution is delivered from tank 10, the above process can be repeated.

It should thus be apparent that I have provided a high efficiency process for making hypochlorite solution which is a significant advancement over the crude techniques heretofore utilized. Moreover, the system is safe, substantially troublefree, and relatively easy to operate.

Having thus described the invention, what is claimed as new and desired to be secured by Letters Patent:

1. In a method of producing hypochlorite solution, the steps of:
    introducing a stream of liquid chlorine into the lower end of an upright, cylindrical, reactor-mixer vessel for immediate change into the gaseous state within the vessel;
    introducing a stream of aqueous sodium hydroxide into the lower end of the vessel simultaneously with said introduction of the chlorine for reaction and mixing with the latter to produce a hypochlorite solution;
    removing the finished hypochlorite solution from the vessel adjacent the upper end of the latter;
    cooling the solution as the chlorine and sodium hydroxide streams react by exposing the same to a centrally disposed, upright cooling tube within the vessel; and
    causing said streams to swirl upwardly through the vessel and around said tube in laminar flow relationship as said reaction, mixing and cooling take place by effecting said introduction of the streams at substantially diametrically opposed locations on the vessel and in tangential relationship with the latter,
    said production of the solution being carried out with an absence of air space in the vessel to prevent escape of the chlorine gas from the solution.

2. A method of producing hypochlorite solution as claimed in claim 1, wherein said vessel is initially filled with said sodium hydroxide before the chlorine is introduced.

3. A method of producing hypochlorite solution as claimed in claim 2, wherein said sodium hydroxide is flowing through said vessel at the time of introducing chlorine.

4. In a method of producing hypochlorite solution as claimed in claim 1, wherein hypochlorite solution leaving said vessel is recirculated back into the latter in the same entering stream as the sodium hydroxide until a predetermined concentration of hypochlorite is obtained.

* * * * *